United States Patent [19]

Rehberger et al.

[11] Patent Number: 6,120,810
[45] Date of Patent: Sep. 19, 2000

[54] BACTERIAL COMPOSITION TO REDUCE THE TOXIC EFFECTS OF HIGH NITRATE CONSUMPTION IN LIVESTOCK

[75] Inventors: Thomas Gerard Rehberger, Wauwatosa, Wis.; Charles Alan Hibberd, Stillwater, Okla.

[73] Assignee: Oklahoma State University, Stillwater, Okla.

[21] Appl. No.: 08/192,488

[22] Filed: Feb. 7, 1994

Related U.S. Application Data

[63] Continuation-in-part of application No. 07/860,083, Mar. 30, 1992, abandoned.
[51] Int. Cl.[7] .................................................... A23K 1/00
[52] U.S. Cl. ................... 426/61; 426/2; 426/69; 426/635; 426/636; 426/807
[58] Field of Search ................ 426/61, 69, 636, 426/807, 635, 2

[56] References Cited

U.S. PATENT DOCUMENTS

| 4,981,705 | 1/1991 | Tomes ........................................ 426/53 |
| 5,096,718 | 3/1992 | Ayres et al. ................................. 426/9 |
| 5,139,777 | 8/1992 | Ott et al. ................................ 424/93 A |
| 5,260,061 | 11/1993 | Ayres et al. ............................. 424/115 |

OTHER PUBLICATIONS

Kemp et al., "Nitrate Poisoning in Cattle. 2. Changes in Nitrate in Rumen Fluid and Methemoglobin Formation in Blood After High Nitrate Intake".
Dialog Abstract No. 690163, Netherlands Journal of Agricultural Science 1977, 25(1): 51–62.

*Primary Examiner*—Leslie Wong
*Attorney, Agent, or Firm*—Nutter, McClennen & Fish, LLP

[57] ABSTRACT

Ruminant intoxication by nitrates is decreased by administering to the animal a composition containing an effective dose of the nitrite reducing microorganism *Propionibacterium acidipropionici*.

16 Claims, 5 Drawing Sheets

BACTERIAL COMPOSITION TO REDUCE THE TOXIC EFFECTS OF HIGH NITRATE CONSUMPTION IN LIVESTOCK

CROSS-REFERENCE TO RELATED APPLICATION

This application is a Continuation-In-Part of U.S. patent application Ser. No. 860,083 filed Mar. 30, 1992, now abandoned.

BACKGROUND OF THE INVENTION

1. Field of the Invention

This invention concerns compositions for ingestion by animals. More particularly, though not exclusively, the present invention concerns the use of microorganisms of the genus Propionibacterium, in reducing nitrate intoxication of ruminants.

2. Brief Description of the Related Art

Ruminant intoxication by nitrates present in forages has been recognized for at least 100 Years. Nitrates are ubiquitous in feed and water and are essentially nontoxic. Nitrates become toxic when reduced to nitrites. Ruminants that consume a high nitrate diet have been reported to adapt and reduce nitrate to nitrite more rapidly due to selection and induction of microbial nitrate reduction activity. As nitrate reduction increases, the rate of nitrate reduction to nitrite exceeds the rate of nitrite reduction to ammonia, resulting in accumulation of toxic levels of nitrite. Nitrite is absorbed into the blood where it converts blood hemoglobin to methemoglobin (heme iron is oxidized from ferrous to ferric form) resulting in a loss of the oxygen transporting capacity of the blood and anoxia of the animal. The resulting characteristic symptom is a chocolate-brown colour to the blood.

Several techniques have been used to control the incidence of nitrate poisoning. Plant management practices such as reducing nitrogen fertilization rates and practicing certain harvest strategies such as cutting stalks 12 to 18 inches (30 to 45 cm) above the ground at full plant maturity and never immediately following rain; help to reduce the amount of nitrate in forage crops but do not eliminate nitrate accumulated in the plant material. Animal management strategies include feeding practices such as diluting high nitrate forages with feed low in nitrate, feeding high nitrate feed gradually to allow for adaption of the ruminal microbes and supplementing diets of high nitrate feed with grain. Although these management practices help reduce the effect of high nitrate feed, young animals or nutritionally stressed animals are more susceptible to nitrate toxicity and may not be protected. In addition, high nitrate diets can reduce feed intake resulting in reduced performance.

The feeding of specific viable microorganisms to livestock with the intent to alter the microbial balance within the gastrointestinal tract has been in practice for many years. Although the mode of action of these direct-fed microbial products and their beneficial effect has not always been scientifically demonstrated, the important role microorganisms play in fermentation and digestion is well recognized. Currently there are no microorganisms fed to livestock for the purpose of reducing nitrate toxicity.

Accordingly, it is the primary objective of the present invention to develop a composition containing microorganisms which when fed to livestock will reduce the effects of nitrate toxicity.

SUMMARY OF THE INVENTION

In accordance with the present invention, there is provided a composition for ingestion by animals, characterized in that the composition comprises a nitrite reducing microorganism, wherein the microorganism is capable of anaerobic denitrification within the animals. The present invention may advantageously provide non-toxic compositions which are suitable for ingestion by ruminants, have a denitrifying effect on nitrites and do not destroy or otherwise adversely affect the naturally occurring microorganisms present in the rumen which are necessary for digestion. The preferred microorganisms are both nitrate and nitrite reducing microorganisms.

In the case of nitrate toxicity, it has clearly been shown that nitrite is the toxic intermediate resulting from nitrate reduction by rumen microorganisms. Therefore, in the present invention the effects of nitrate toxicity are reduced by increasing the reduction of nitrite in the rumen. This is accomplished by feeding a composition which contains viable microorganisms capable of nitrite reduction in the rumen. The microorganisms in the composition are Propionibacteria which are capable of reducing the accumulated nitrites in the rumen and do not destroy or adversely affect the naturally occurring microorganisms present in the rumen.

In summary, the present invention provides a method for reducing the toxic effects of nitrates in animals by administering a small but nitrite reducing amount of certain species of the genus Propionibacterium, particularly acidipropionici, and most particularly strain $P_5$.

DETAILED DESCRIPTION OF THE PREFERRED EMBODIMENTS OF THE INVENTION

In one embodiment of the present invention, the compositions are intended to increase the reduction of nitrite within the animal i.e. by an in vivo process. Such compositions are preferably in the form of carrier food compositions containing the microorganism and one or more feed stuffs for ruminants, such as cereals (barley, maize, oats and the like), oilseed cakes, vegetable wastes bran, bagasse and the like); starches (tapioca and the like). Such feed compositions may also contain quantities of other additives such as mineral salts, vitamins, trace elements, fats, aromatizing products and binders. When ruminants are mainly fed on feed compositions, the amount of microorganism in the composition is generally formulated to deliver from about $1 \times 10^7$ Colony Forming Units (CFU) per Ml ruminal fluid per animal per day for a period of 7–10 days. The amount of microorganism in the feed composition is adjusted based on ruminal volume.

The feed compositions of the present invention may be presented in various physical forms, for example in pellets, capsules, granulated, powdered or liquid or semi-liquid forms. The compositions can also be presented in the form of a complement to normal feed. They can therefore be presented in the form of prophylactic or veterinary compositions containing the microorganism, preferably a glucide carrier which the animal can digest, and various other additives such as vitamins, mineral salts, trace elements, emulsifiers, aromatising products and binders as well as certain active substances adapted to be specific to the requirements of the animal. These supplements can be presented in different physical forms, for example as powders, compacted or granulated solids or semi-liquids, and can be given to the animals as a suplement which is separate from the feed products. They can also be advantageously mixed with food rations at the moment of use. Such veterinary compositions may be formulated to provide $1 \times 10^7$ CFU/Ml ruminal fluid/animal/day.

The compositions of the present invention may also be presented in the form of lick-sticks or lick-stones. In addition to the microorganism, such compositions may comprise other additives such as vitamins, trace elements, mineral salts, sulphur, sulphides, glucide carriers, aromatising products and various types of binders (cements, gypsum, lime, calcium phosphate, hydroxide and carbonate, magnesium sulphate, oxide and hydroxide, aluminium sulphate, alum and gelatin).

The microorganism is selected from the genus of microorganisms commonly known as Propionibacterium. The preferred strains of bacterium include the *Propionibacterium acidipropionici* strains, especially strain $P_5$. The strain $P_5$ is available from the microorganism collection of the American Type Culture Collection (ATCC), 12301 Parklawn Drive, Rockville, Md., 20852, under accession number 55467.

Figure 1:
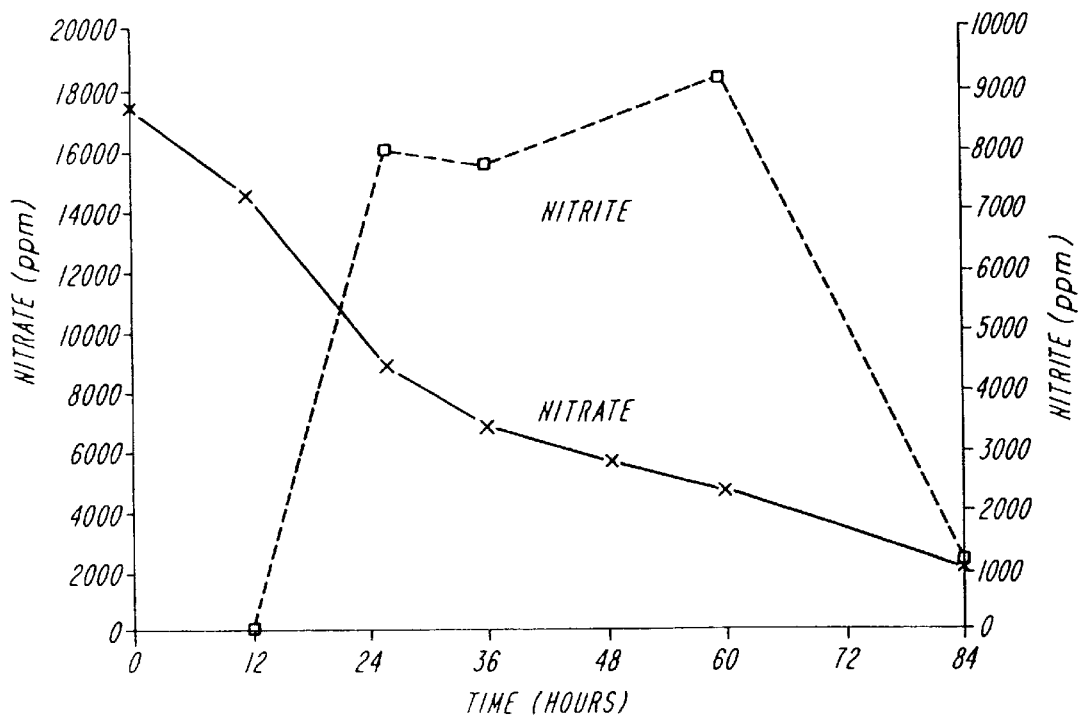
FIG. 1 is a graphical representation of denitrification by *Propionibacteria acidipropionici* strain $P_5$ in growth medium.

The invention will now be further described, without limitation, with reference to the following examples:
In Vitro Activity Seventeen of the 154 strains in a Propionibacterium culture collection were found to reduce nitrate to $N_2O$ or $N_2$ (denitrification). The reduction of nitrate and nitrite in growth medium by strain $P_5$ is shown in FIG. 1. When broth medium was inoculated with strain $P_5$ at 1% ($10^5$ CFU/ml), 50% of the nitrate was reduced in 24 h. Nitrite accumulation started at 12 h and continued for the next 60 h, after which time nitrite was reduced. All other strains reduced nitrate and nitrite at a slower rate. Therefore, strain $P_5$ was chosen for further work.

The time course of nitrate/nitrite reduction shown in FIG. 1 may indicate a common regulatory control system of the nitrate and nitrite reductase enzymes. The nitrate/nitrite reduction was also found to be inducible as reported by other researchers. These findings are critical for the performance of the culture and have been exploited to increase activity in the production culture.

Figure 2:
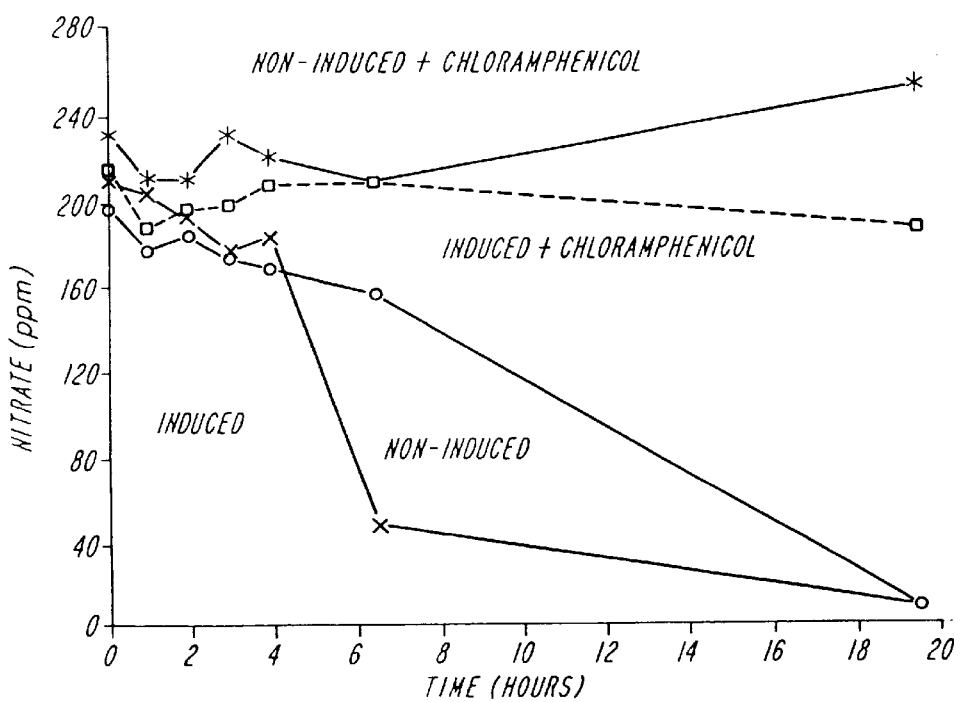
FIG. 2 is a graphical representation of nitrate and nitrite reductions observed in an in-vitro study.

Since ruminal levels of nitrate are not expected to reach these high levels, a second in vitro experiment was conducted to compare nitrate and nitrite reduction in growing and non-growing cells which were induced or non-induced for nitrate reduction (FIG. 2). Induced, growing cells were able to reduce 80% of the nitrate in 6 h. Non-induced, growing cells required 16 h to reduce an equivalent amount of nitrate. All non-growing cells (chloramphenicol added) were unable to reduce nitrate to any significant degree. This may indicate that growth is required for nitrate reduction.
Establishment Trials Animal trials were conducted to determine if strain $P_5$ could be established in the rumen. Strain $P_5$ was fed to eight crossbred beef heifers fitted with ruminal cannulas. In the first trial, heifers were fed strain $P_5$ at a dose of $10^5$ CFU/ml of rumen contents daily for a 30-day period. In the second trial, heifers were fed strain $P_5$ at a dose of $10^7$ CFU/ml daily for 30 days. In both trials, two heifers which did not receive the culture served as controls. All animals were fed a 50:50 concentrate:roughage diet balanced for protein, minerals and vitamins. Ruminal samples were collected on days 0, 1, 2, 3, 4, 5, 7, 10, 14, 18, 21, 24, 29 and 32. Samples were plated ($10^{-3}$, $10^{-4}$, $10^{-5}$) on selective medium and incubated for 7–10 days under anaerobic conditions at 32° C. Following incubation, typical colonies of Propionibacteria were enumerated and identified using plasmid DNA profiles.

Five of the eight animals fed strain $P_5$ at $10^5$ CFU/ml of rumen contents had detectable levels of Propionibacteria (>$10^3$ CFU/ml) by day 18. By day 30, all eight treated heifers had Propionibacteria counts greater than $10^4$ CFU/ml. Controls had no detectable Propionibacteria counts. Propionibacteria counts of samples taken 2 and 10 days following the trial (no culture was fed) indicated the Propionibacteria populations were not reduced in heifers in which the organisms had established.

In trial 2 ($10^7$ CFU/ml daily), Propionibacteria were detected earlier than trial 1. On day 10, all eight heifers had counts greater than 1,000 CFU/ml. At the end of the trial, all eight heifers had Propionibacteria counts greater than 100,000 CFU/ml. Controls had no detectable Propionibacteria.
Nitrate Toxicity Trials The results of animal trials indicate that a viable population of strain $P_5$ could be established in the rumen. Nitrate toxicity trials were conducted to determine if the established population was capable of reducing the toxicity of a high dose of nitrate.

Figure 3:
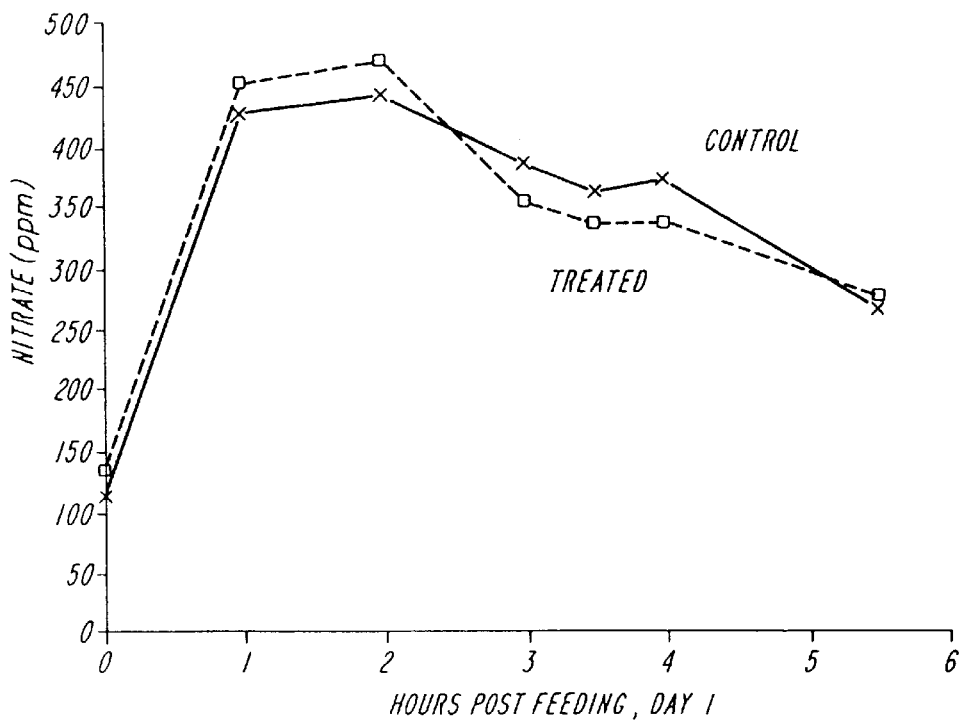
FIG. 3 is a graphical representation of ruminal nitrate concentrations for inoculated heifers and uninoculated controls following 14 days on a low nitrate diet and 7 days on low quality native grass hay, followed by straight pearl millet hay (20,000 ppm nitrate). (Trial 1)
Figure 4:
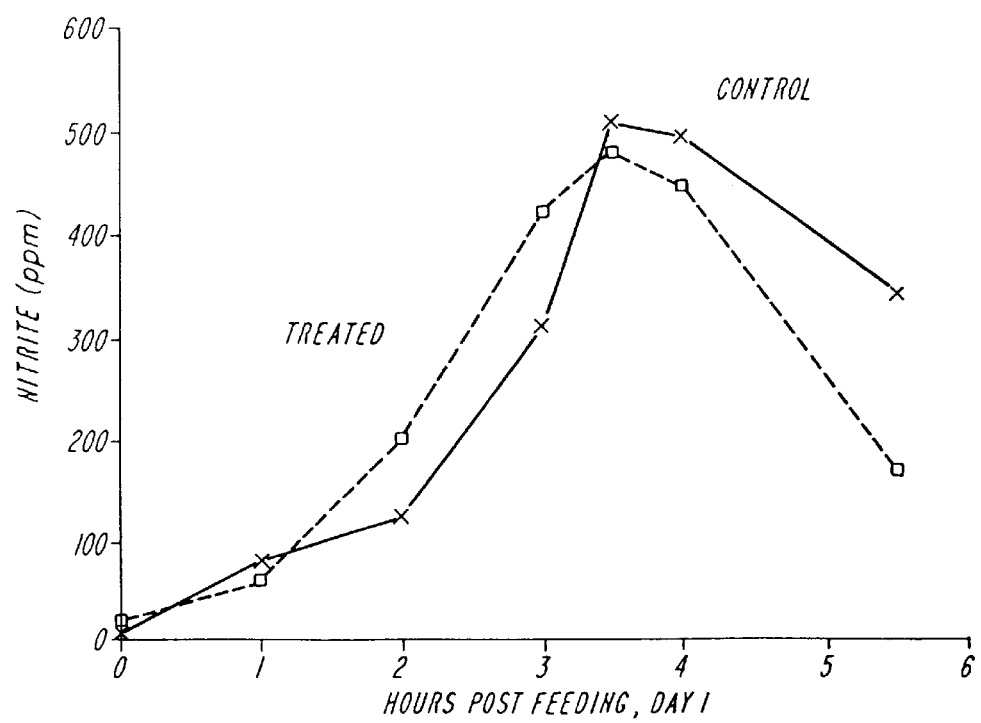
FIG. 4 is a graphical representation of ruminal nitrite concentrations observed in heifers inoculated with Propionibacteria compared to uninoculated controls, coincident with FIG. 3. (Trial 1)

Nine crossbred beef heifers (500 Lb) fitted with ruminal cannulas were used to evaluate the effect of feeding Propionibacteria on ruminal nitrate/nitrite and blood nitrite. Five heifers were dosed daily with the Propionibacteria culture ($10^7$ CFU/ml ruminal fluid) while the remaining four heifers served as controls. Heifers were fed coarsely chopped low-quality native grass hay for seven days prior to the nitrate challenge. The nitrate challenge was accomplished with the use of a coarsely chopped pearl millet hay that contained approximately 20,000 ppm nitrate.
Trial 1—20,000 ppm Nitrate Challenge:

Following 14 days on a low nitrate diet and seven days on low-quality native grass hay, all heifers were offered straight pearl millet hay (20,000 ppm nitrate) as a high nitrate challenge. Frequent rumen and blood samples were collected to monitor nitrate/nitrite status. Ruminal nitrate concentrations (FIG. 3) increased rapidly and peaked two hours post-feeding. Inoculated heifers had ruminal nitrate concentrations that were similar to the controls even though hay intake was higher (21%) for the inoculated heifers. Ruminal nitrate concentrations peaked at approximately 450 ppm which was 3-fold higher than ruminal nitrate concentrations observed when animals were fed 10,000 ppm nitrate (data not shown). Compared to the control, ruminal nitrite concentrations appeared to increase sooner for the inoculated heifers but also declined more rapidly (FIG. 4). The impact of this response can be considered two ways. First, by extrapolation of the nitrite curves to zero, the area under the curve, or total quantity of ruminal nitrite was reduced by 43% for the inoculated heifers compared to the controls. Alternately, if we arbitrarily choose 200 ppm as a toxic threshold, control heifers will be exposed to ruminal nitrite concentrations in excess of 200 ppm 40% longer than inoculated heifers. Regardless of the method of expression, the ruminal nitrite load was significantly reduced with Propionibacteria inoculation.

Figure 5:
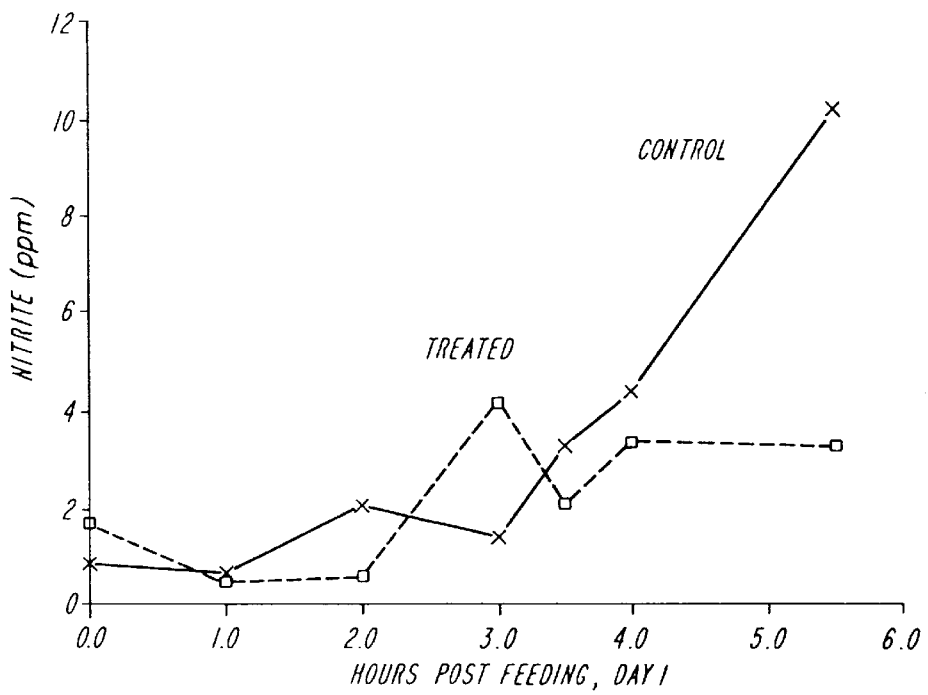
FIG. 5 is a graphical representation of blood nitrite concentrations observed in the group measured in FIG. 4. (Trial 1)

Blood nitrite concentrations (FIG. 5) verify the differences noted in ruminal nitrite. Blood nitrite concentrations increased slowly until three hours post-feeding and then plateaued. In contrast, blood nitrite concentrations for the control heifers began to increase at 3 hours post-feeding and continued to increase for the remainder of the sampling period. These data suggest that control heifers were exposed to a significantly higher blood nitrite load than heifers inoculated with Propionibacteria.

Figure 6:
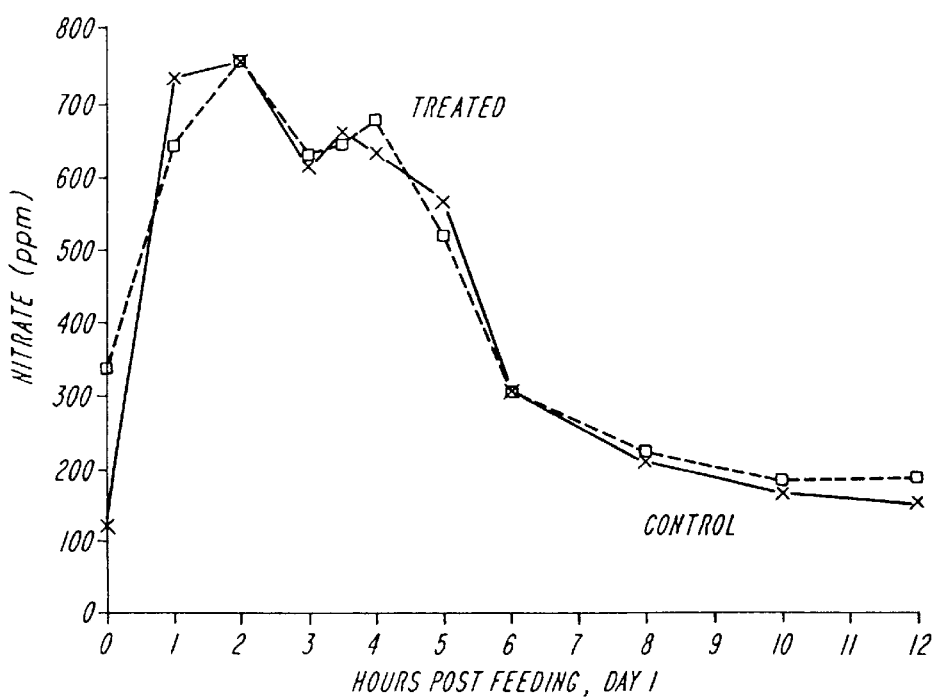
FIG. 6 is a graphical representation of ruminal nitrate concentrations for inoculated heifers and uninoculated controls following 14 days on a low nitrate diet and 7 days on low quality native grass hay, followed by straight pearl millet hay (20,000 ppm nitrate). (Trial 2)
Figure 7:
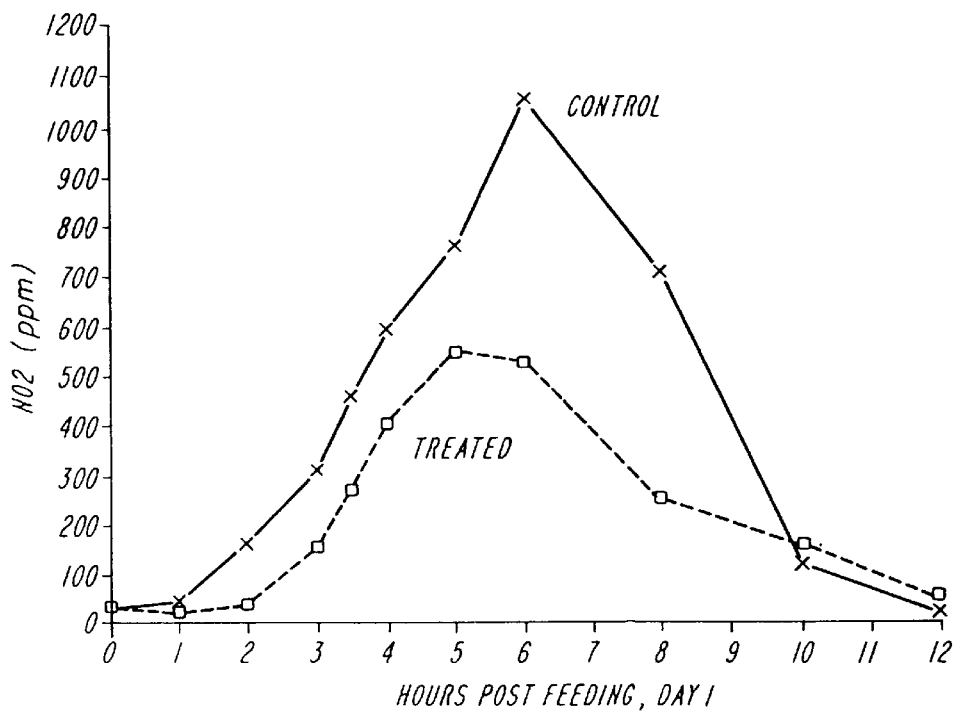
FIG. 7 is a graphical representation of ruminal nitrite concentrations observed for the group of heifers associated with FIG. 6. (Trial 2)

Trial 2—20,000 ppm Nitrate Challenge:

In order to obtain additional data to confirm the findings of trial 1, a duplicate high nitrate challenge trial was conducted. Following 14 days on a low nitrate diet and seven days on low-quality native grass hay, all heifers were offered straight pearl millet hay (20,000 ppm nitrate) as a high nitrate challenge. Ruminal samples were collected to monitor nitrate/nitrite status. Blood samples were collected to monitor nitrite and, in addition, methemoglobin and total hemoglobin concentrations. Ruminal nitrate concentrations (FIG. 6) increased rapidly and peaked two hours post-feeding. Inoculated heifers had ruminal nitrate concentrations that were similar to the controls even though hay intake was higher (17.5%) for the inoculated heifers. Ruminal nitrate concentrations peaked at approximately 750 ppm which was 67% higher than ruminal nitrate concentrations observed in trial 1. Ruminal nitrite concentrations (FIG. 7) appeared to increase later for the inoculated heifers and peaked at a much lower level (525 ppm). Ruminal nitrite concentrations in control heifers increased more rapidly and peaked at 1075 ppm. Compared to the control, total rumen nitrite was reduced by 46% for the inoculated heifers. This was nearly identical to the 43% reduction in total ruminal nitrite observed in trial 1.

Figure 8:
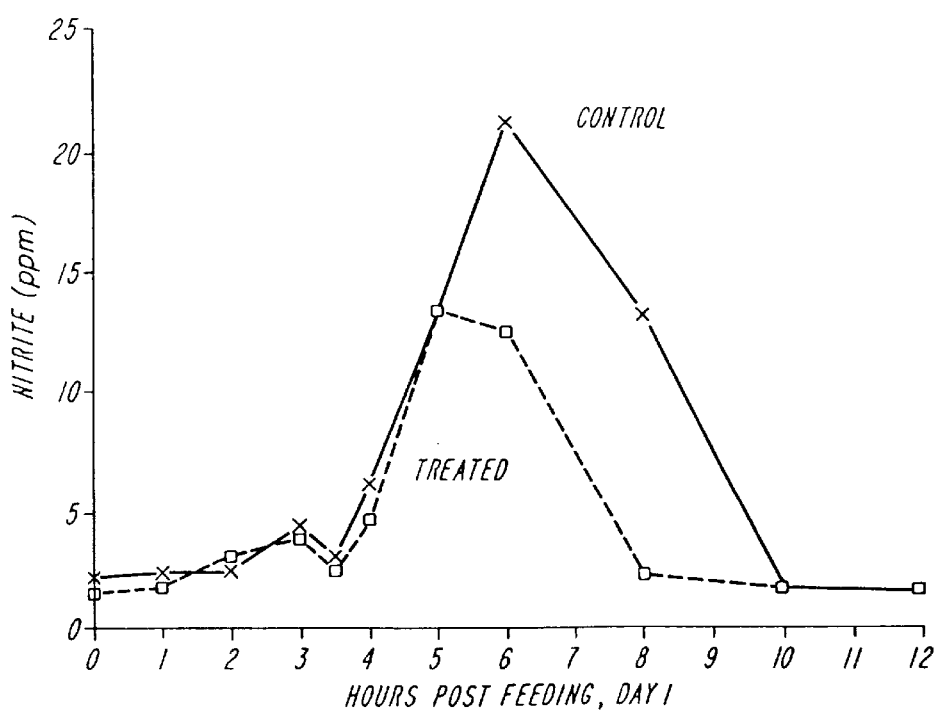
FIG. 8 is a graphical representation of blood nitrite concentrations observed in the group of animals studied in FIG. 7. (Trial 2)
Figure 9:
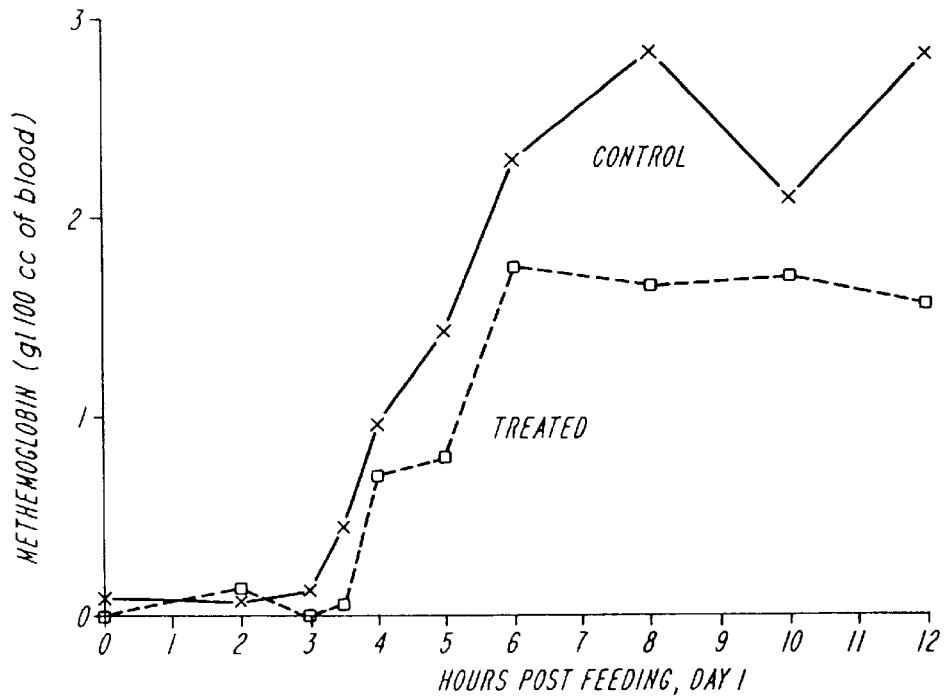
FIG. 9 is a graphical representation of methemoglobin concentrations observed in the animals of FIG. 6. (Trial 2)

Blood nitrite concentrations (FIG. 8) mimicked the differences noted in ruminal nitrite concentrations. Blood nitrite concentrations increased slowly in both groups until three hours post-feeding. Blood nitrite concentrations for the treated heifers peaked at 13 ppm and decreased rapidly. In contrast, blood nitrite concentrations for the control heifers peaked at 22 ppm and decreased more slowly. These data suggest that control heifers were exposed to a significantly higher blood nitrite load than the heifers inoculated with Propionibacteria. Methemoglobin concentrations (FIG. 9) remained low until three hours post-feeding. Concentrations of methemoglobin for the treated heifers increased from three to six hours post-feeding and then plateaued at 1.75 g/100 ml of blood. In contrast, methemoglobin concentrations for control heifers continued to increase from three to seven hours post-feeding to a concentration of 2.75 g/100 ml of blood. After seven hours post-feeding, the mean methemoglobin concentration for the control group appears to decrease however, this was due to the elimination of methemoglobin concentrations from blood samples not collected from a heifer that was treated for symptoms of acute nitrate toxicity.

Summary and Conclusions—Trials 1 and 2:

Ruminal nitrate/nitrite and blood nitrite increased significantly when high nitrate hay (20,000 ppm) was fed to unadapted heifers. Inoculation with Propionibacteria reduced ruminal nitrite load by 40–46% and minimized changes in blood nitrite and methemoglobin. In contrast, blood nitrite and methemoglobin concentrations in control heifers continued to increase throughout the sampling period. When the increased hay intake for inoculated heifers is also noted, this response becomes even more remarkable.

In conclusion, these studies suggest that continuous inoculation with Propionibacteria may have a significant prophylactic value when feeding high nitrate hay. If the 40–46% reduction in ruminal nitrite is accurate, this suggests that hay containing 16,600 ppm nitrate could be fed with the same confidence as 10,000 ppm nitrate hay. Consequently, the risk of nitrate toxicosis would be significantly reduced.

Additional Considerations for the Development of a Direct-fed Microbial to Reduce Nitrate Toxicity.

A number of other issues important to the function of *Propionibacterium acidipropionici* strain $P_5$ in reducing ruminal nitrite levels have been examined. These include the susceptibility of strain $P_5$ to common antibiotics used in the industry, longterm ruminal establishment, retention of nitrite reductase activity and determination of the minimum effective dose. A brief summary of some of the experiments conducted to address these issues is presented.

Susceptibility of $P_5$ Antimicrobials

The survival of strain $P_5$ in ruminal fluid was monitored in vitro in the presence of various antibiotics commonly used as animal health products in the cattle industry. RUMENSIN (monensin sodium salt), AUREOMYCIN (chlortetracycline) and DECCOX (decoquinate) were obtained as feed-grade antibiotics from commercial sources. Antibiotics were added individually at recommended levels and at 2 times the recommended levels to ruminal fluid samples. In order to test for effects on both established populations and a fresh inoculum, rumen fluid consisted of composite samples from animals established with strain $P_5$ and Propionibacteria-free composite rumen samples to which a fresh inoculum of freeze-dried strain $P_5$ was added. Rumen samples were incubated at 39 C. for 48 hours. Samples were taken every 12 hours to enumerate the Propionibacteria populations. Controls consisted of both types of rumen fluid samples without antibiotics added.

None of the antibiotics tested decreased the Propionibacteria population of the established or freshly inoculated rumen fluid. Therefore, it appears that these antibiotics will have no adverse effects on establishment or maintenance of strain $P_5$ populations in the rumen.

Maintenance of $P_5$ in the Rumen

Initial ruminal establishment studies of strain $P_5$ focused on the establishment time and level of $P_5$ populations achieved with daily dosing. Counts taken at two and ten days post-inoculation indicated that the Propionibacteria populations were maintained, however, long term ruminal establishment of strain $P_5$ was not initially examined.

Long term establishment/maintenance

Three crossbred cows fitted with ruminal cannulas were used to evaluate the long term survival and maintenance of populations of strain $P_5$ in the rumen. Each cow was dosed daily ($10^7$ CFU/ml ruminal fluid) with strain $P_5$ for a period of 21 days. Following this establishment period, dosing to all cows ceased. Ruminal samples were taken monthly to determine the viable Propionibacteria populations.

At the end of the 21 day establishment period, all cows had populations greater or equal to $10^5$ CFU/ml. Results of monthly sampling indicate that populations fluctuate from $10^4$ to $10^5$ CFU/ml but have been maintained at these levels for 180 days.

Maintenance of Denitrifcation Activity

The consistent results of enumeration studies indicate the long term establishment and maintenance of strain $P_5$ in the rumen. While this is encouraging, the denitrifying activity of these populations has never been confirmed. Given the fact that denitrification activity has been reported to be inducible in Propionibacteria, the question remained as to whether an established culture is still capable of denitrification. Further, if denitrification activity is present, is it enough to protect the animal from nitrate toxicity?

Effects of withdrawal time on Denitrification

Six heifers fitted with ruminal cannulas were used to evaluate the effect of time of withdrawal on denitrification activity. Two heifers were dosed daily ($10^7$ CFU/ml) throughout the study, two heifers were withdrawn from daily dosing at day 0 and the remaining two heifers were not given any culture and had last received culture in April 1992. At 4, 7 and 11 days withdrawal from daily dosing, rumen fluid was collected from all heifers and used in an in-vitro denitrification assay.

In vitro ruminal nitrate concentrations on day 4, 7 and 11 of withdrawal were higher than animals dosed daily or withdrawn for 7 months. Thus the rate of nitrate reduction was lower for these animals. Ruminal nitrite concentrations on day 4, 7 and 11 of withdrawal were significantly lower than animals dosed daily or withdrawn for 7 months. Taken together, these results suggest that during the withdrawal time examined here, heifers manage higher levels of nitrate more effectively. This is probably the direct result of reduced nitrate reduction. At extended withdrawal times (7 months), nitrate reduction increases; however, nitrite reduction activity still remains. If this activity is enough to protect the animal from nitrate toxicity will be addressed in future in vivo studies.

The addition of freeze dried cells of $P_5$ to rumen fluid from animals withdrawn for 7 months tended to decrease nitrate reduction and increase nitrite reduction. These results provide preliminary evidence to support a single establishment period for increasing the efficiency of managing high nitrate concentrations in the rumen.

Dose Response

The daily dose of $P_5$ found to significantly reduce the effects of a high nitrate diet was $10^7$ CFU/ml of rumen fluid. Therefore, in a 350–500 lb animal (typical of stocker cattle) which has a 25 liter rumen, the effective daily dose is $2.5 \times 10^{11}$ CFU. Based on establishment trials, feeding this daily dose for 7–10 days will establish the effective population. Lower doses of $P_5$ have not been examined. In order to more accurately determine the minimal effective dose, a dose response trial was conducted.

Dose Response in Vitro

Freeze-dried strain $P_5$ was added to flasks of Propionibacteria-free rumen fluid to provide a $10^5$, $10^7$, and $10^9$ CFU/ml inoculum. Nitrate was added to each flask to a level of 1500 ppm and the flasks were incubated at 39° C. Nitrite levels were monitored over a 30 hour period. Duplicate flasks were prepared for each inoculum level.

Figure 10:
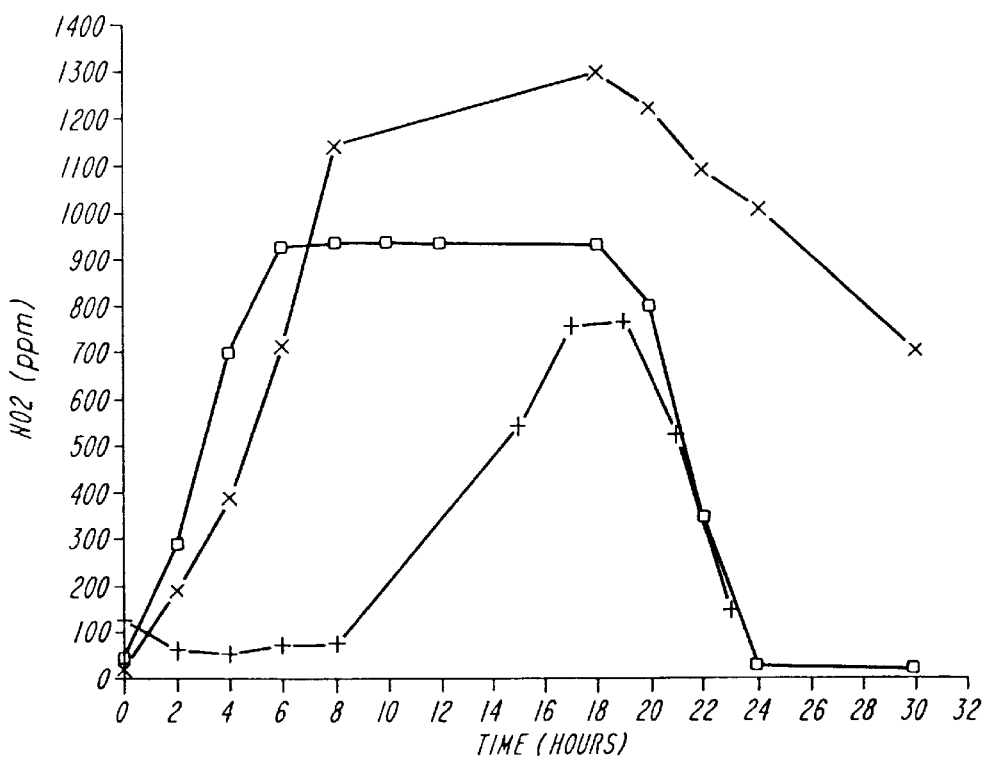
FIG. 10 is a graphical representation of ruminal nitrite reduction (in-vitro) over a period of time in response to varied dosages of the $P_5$ strain.

Nitrite concentrations in rumen fluid treated with $10^9$ CFU/ml increased slower and remained lower than samples treated with lower levels of strain $P_5$ (FIG. 10). Nitrite concentration decreased faster in rumen samples treated with $10^7$ or $10^9$ CFU/ml compared to samples treated with 105 CFU/ml. These data suggest that there is a significant dose response effect.

Implications

The nitrate toxicity studies suggest that Propionibacterium strain $P_5$ exerts a measure of prophylaxis when cattle consume large quantities of nitrate. Consequently, production losses to nitrate toxicity should be significantly reduced when producers use this strain as a direct-fed microbial at effective doses. Strain $P_5$ is stably maintained in the rumen without continuous feeding and retains nitrite reduction activity. The viability of strain $P_5$ is unaffected by antimicrobials such as monensin, chlorotetracycline and dequinate. Therefore, a direct-fed microbial product containing strain $P_5$ fed at effective doses will be an effective component of a nitrate management program.

Those skilled in the art will appreciate that the scope and the spirit of the invention includes genetic equivalents of the $P_5$ strain of microorganism. The term is customary in the art and has been defined in U.S. Pat. No. 4,981,705 at Col. 4, which is incorporated herein by reference thereto.

What is claimed is:

1. A composition for ingestion by a ruminant, which comprises; a carrier feed composition containing a nitrite reducing microorganism selected from the group consisting of *Propionibacterium acidipropionici* strain $P_5$ and a genetic equivalent.

2. The composition of claim 1 wherein the microorganism is *Propionibacterium acidipropionici* strain $P_5$.

3. A method of treating a ruminant intoxicated by nitrates, which comprises; establishing in the ruminant's rumen a population of nitrite reducing microorganisms which are capable of anaerobic denitrification in said rumen.

4. A method according to claim 3 wherein the microorganism is selected from the group of genus Propionibacterium.

5. A method according to claim 3 wherein the microorganism is *Propionibacterium acidipropionici* strain $P_5$.

6. A method according to claim 3 wherein the population is established by feeding the ruminant a feed composition containing the microorganism.

7. A method according to claim 6 wherein the microorganism is selected from the group consisting of *Propionibacterium acidipropionici*, strain $P_5$ and a genetic equivalent.

8. A method according to claim 7 wherein the microorganism selected is *Propionibacterium acidipropionici*, strain $P_5$.

9. A method according to claim 3 wherein the population is established by feeding the ruminant a feed composition containing the microorganisms such that the amount of microorganism delivered to the ruminant is about $1 \times 10^7$ CFU/Ml ruminal fluid/animal/day for a period of 7–10 days.

10. A method of preventing nitrate intoxication in a ruminant subject to such intoxication by the ingestion of a high nitrate feed, which comprises; establishing in the ruminant's rumen a population of nitrite reducing microorganisms which are capable of anaerobic denitrification in said rumen.

11. A method according to claim 10 wherein the microorganism is selected from the group of genus Propionibacterium.

12. A method according to claim 10 wherein the microorganism is *Propionibacterium acidipropionici*, strain $P_5$.

13. A method according to claim 10 wherein the population is established by feeding the ruminant a feed composition containing the microorganism.

14. A method according to claim 13 wherein the microorganism is selected from the group consisting of *Propionibacterium acidipropionici* strain $P_5$ and a genetic equivalent.

15. A method according to claim 14 wherein the microorganism selected is *Propionibacterium acidipropionici*, strain $P_5$.

16. A method according to claim 10 wherein the population is established by feeding the ruminant a feed composition containing the microorganism such that the ruminant is dosed daily with $10^7$ CFU/ml ruminal fluid until populations of $10^4$ to $10^5$ CFU/ml ruminal fluid are established in the rumen.

* * * * *